(12) United States Patent
Goehring et al.

(10) Patent No.: US 11,558,241 B1
(45) Date of Patent: Jan. 17, 2023

(54) IDENTIFYING AND LOCALIZING EQUIPMENT FAILURES

(71) Applicants: AT&T Intellectual Property I, L.P., Atlanta, GA (US); AT&T Mobility II LLC, Atlanta, GA (US)

(72) Inventors: George Goehring, Atlanta, GA (US); Barry Karesh, Plano, TX (US); Rudolph Mappus, Plano, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/471,413

(22) Filed: Sep. 10, 2021

(51) Int. Cl.
   *H04L 41/0677* (2022.01)
   *H04L 41/0686* (2022.01)
   *H04L 41/0631* (2022.01)

(52) U.S. Cl.
   CPC ........ *H04L 41/0677* (2013.01); *H04L 41/065* (2013.01); *H04L 41/0686* (2013.01)

(58) Field of Classification Search
   CPC ............... H04L 41/0677; H04L 41/065; H04L 41/0686
   See application file for complete search history.

(56) References Cited

U.S. PATENT DOCUMENTS

| 11,431,550 | B2* | 8/2022 | Zafer | H04L 41/0654 |
| 2019/0379577 | A1* | 12/2019 | Tiwari | H04L 41/0654 |
| 2020/0374199 | A1* | 11/2020 | Arrabolu | H04L 41/22 |
| 2021/0314242 | A1* | 10/2021 | Majumder | H04L 67/10 |

* cited by examiner

*Primary Examiner* — Bryan Lee

(74) *Attorney, Agent, or Firm* — Amin, Turocy & Watson, LLP

(57) ABSTRACT

The disclosed technology is directed towards automatically detecting failure states and the cause of the failure. For a network, the technology collects status messages from equipment and customers into batches as they occur. The technology groups and aggregates messages, then transforms the aggregations to the frequency domain. Anomalies induce detectable changes in the particle distribution of a trained particle filter, from which an anomalous spectrogram is generated. The status messages of each device are iteratively removed from the larger set of messages, resulting in reduced subsets that are each aggregated, transformed into a modified spectrogram and compared against the anomalous spectrogram to obtain a distance score. The distance score for each device is used to rank the devices with respect to being the cause of the failure.

20 Claims, 14 Drawing Sheets

IDENTIFYING AND LOCALIZING EQUIPMENT FAILURES

TECHNICAL FIELD

The subject application relates to network equipment in general, and more particularly to identifying and localizing equipment failures, such as network devices in a network topology.

BACKGROUND

When network devices fail, network service providers need to determine what occurred, including which device has failed, so that remedial actions can be taken. Failures can lead to service outages and the like; network service providers want to rapidly restore their services to consumers. However, network service providers face significant challenges in restoring services, including localizing trouble when a network device fails.

While network devices often notify other devices when problems arise by raising alarms, when a device fails the lack of alarm data does not necessarily mean that device has failed or is failing. Detecting when a device has failed based on its output alarms is a variation of the halting problem, a problem shown to be undecidable in polynomial time for deterministic Turing machines One problem is that the status messages of network devices may be sent using connectionless communication methods, which are not guaranteed to arrive, nor are they verified in the same way that other error correcting methods guarantee. Customer indications of problems suffer from a similar unreliability. For one, customers may indicate network troubles when equipment is not in a failure state. For another, customers do not always contact the service provider when there are network faults. In general, with respect to possible or actual failures, network devices provide relative noisy, unreliable signals. A network service provider wants to rapidly determine when and where a network fault occurs, particularly when an equipment failure occurs, rather than when line faults occur.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
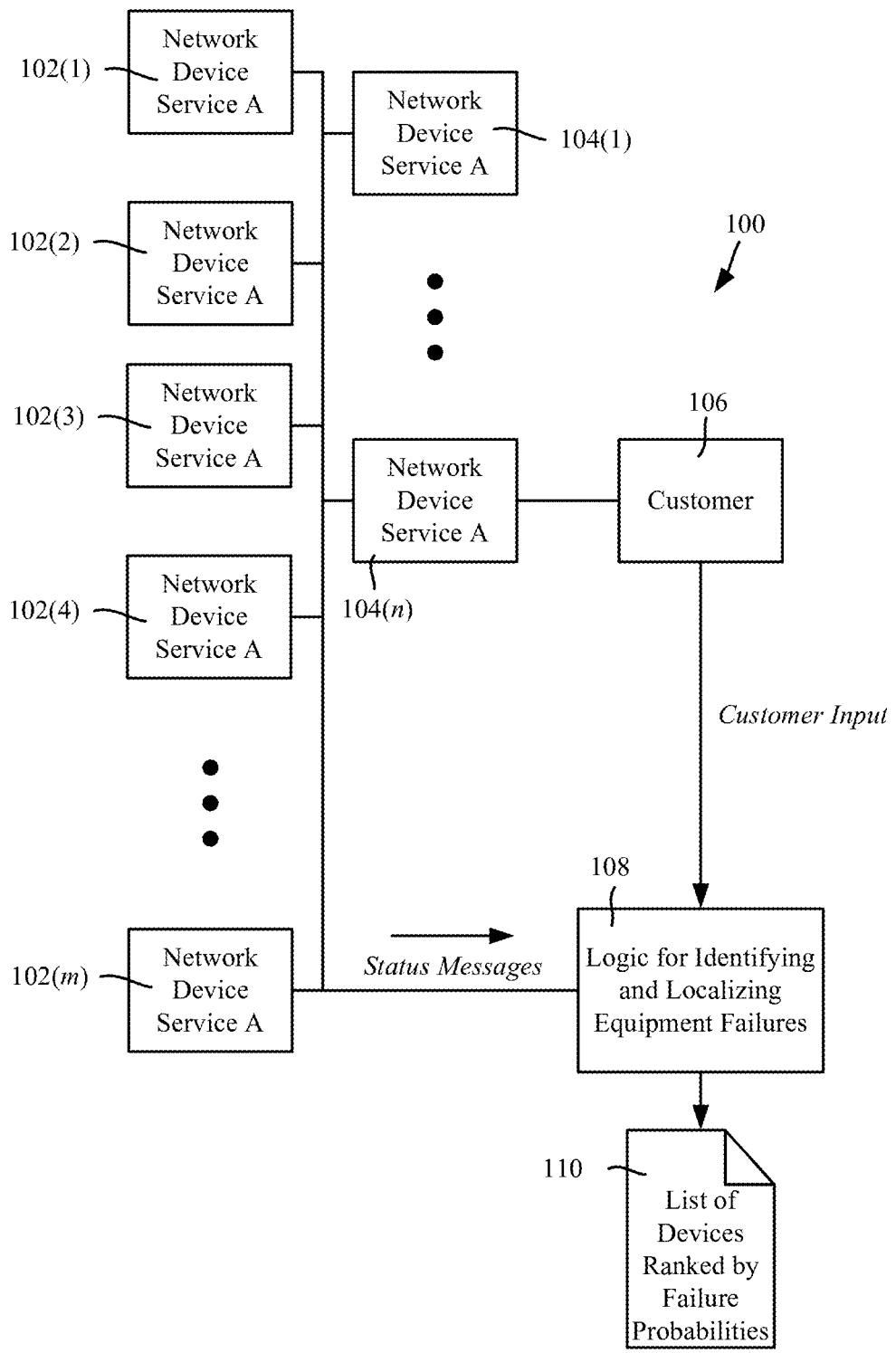
FIG. 1 is a block diagram illustrating an example network topology in which network equipment output status messages, in accordance with various aspects and embodiments of the subject disclosure.

The technology described herein is generally directed towards identifying failures in equipment, such as network devices including, but not limited to, wired backbone devices such as routers and switches. Once a failure state is detected, the technology further operates to localize which device has failed.

In a first failure state detection phase, the messages associated with a group of network devices are processed to evaluate whether that group is operating in a failure state. To this end, the network devices are grouped according to a criterion or criteria, such as by customer and/or services that a group of network devices provide. The status messages related to that group are aggregated into aggregated message batches, comprising counts of the messages versus time. An aggregated message batch is transformed to the frequency domain to provide a frequency domain representation of the aggregated message batch, which corresponds to a spectrogram. The spectrogram is processed by a particle filter trained with known good operating state data. If a resulting particle distribution is significantly changed, corresponding to a low probability failure event, then a failure state is determined to exist for that group of network devices, with the spectrogram considered to be an anomalous spectrogram. If the devices are considered to be operating normally, no further action need be done at this time.

If a failure state is determined to exist among the group, a second localization phase is performed to determine which device most likely caused the anomalous spectrogram. To this end, the devices are iteratively selected, and for each iteration, the messages of the selected device are removed, the remaining messages aggregated into a reduced message batch (of the non-removed message counts over time), and a transform is applied to create a frequency domain (spectrogram) associated with the selected device. Each per-device spectrogram is compared with the anomalous spectrogram, e.g., via image comparison techniques, to determine a similarity score, which indicates the likelihood of the selected device being the cause of the failure. The devices (e.g., identified by their IDs) can be ranked by their respective similarity scores, and output to a technician or the like who can start diagnosing the network failure issue based on the network device ID of the most likely failed device.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "network equipment," "network element" and "network device" may be employed interchangeably throughout, unless context warrants particular distinctions among the terms. It should be appreciated that the technology described herein can similarly be applied to non-network equipment, such as any time there are a number of messages or similar data associated with multiple sources, such as data (e.g., login patterns) that can be processed for fraud detection.

As shown in the example system 100 of FIG. 1, a number of network devices 102(1)-102(m) and 104(1)-104(n) are coupled together to provide a network service to a customer 106 or the like. The customer 106 can be any entity, from a large enterprise to a single individual or a group of individuals related in some way (e.g., geographically in some served region). In the example of FIG. 1, one depicted set of the network devices 104(1)-104(n) are closer in proximity to the customer 106 than the other depicted set of the network devices 102(1)-102(m). As is understood, there can be additional sets of network devices depending on a given network topology or the like. Notwithstanding, any devices that provide status messages or report other information can be used with the technology described herein, including (but not limited to) network devices such as switches and routers of wireline/backbone/core networking equipment, as well as servers, virtual machines, storage devices, mobility equipment, radios (e.g., connection data, interference data) and the like.

The status messages (e.g., in any appropriate format) of the network devices 102(1)-102(m) and 104(1)-104(n) are collected, as they occur, for use in subsequent processing by logic 108 or the like for identifying and localizing equipment failures. Status messages from equipment can include, but are not limited to Simple Network Management Protocol (SNMP) messages, error codes, and other status messages. Further, status messages comprising customer input can be obtained from the customer 106 and associated with one or more of the network devices 102(1)-102(m) and 104(1)-104(n). The status messages can be batches collected over time windows, and such batches can be overlapped in time. Note that additional status messages can be collected from other equipment, customers or the like (not shown), as the logic 108 can group (e.g., filter, sort and the like) messages for processing in any way deemed appropriate for a given failure evaluation scenario. As described herein, if, based on the status messages including any customer input, a group of network devices is deemed to be in a failure state, the logic 108 performs some localizing action, such as in the example of FIG. 1 to output a list 110 of devices ranked by probability scores, with each device and its associated probability score indicative of whether that device is responsible for the failure state.

Figure 2:
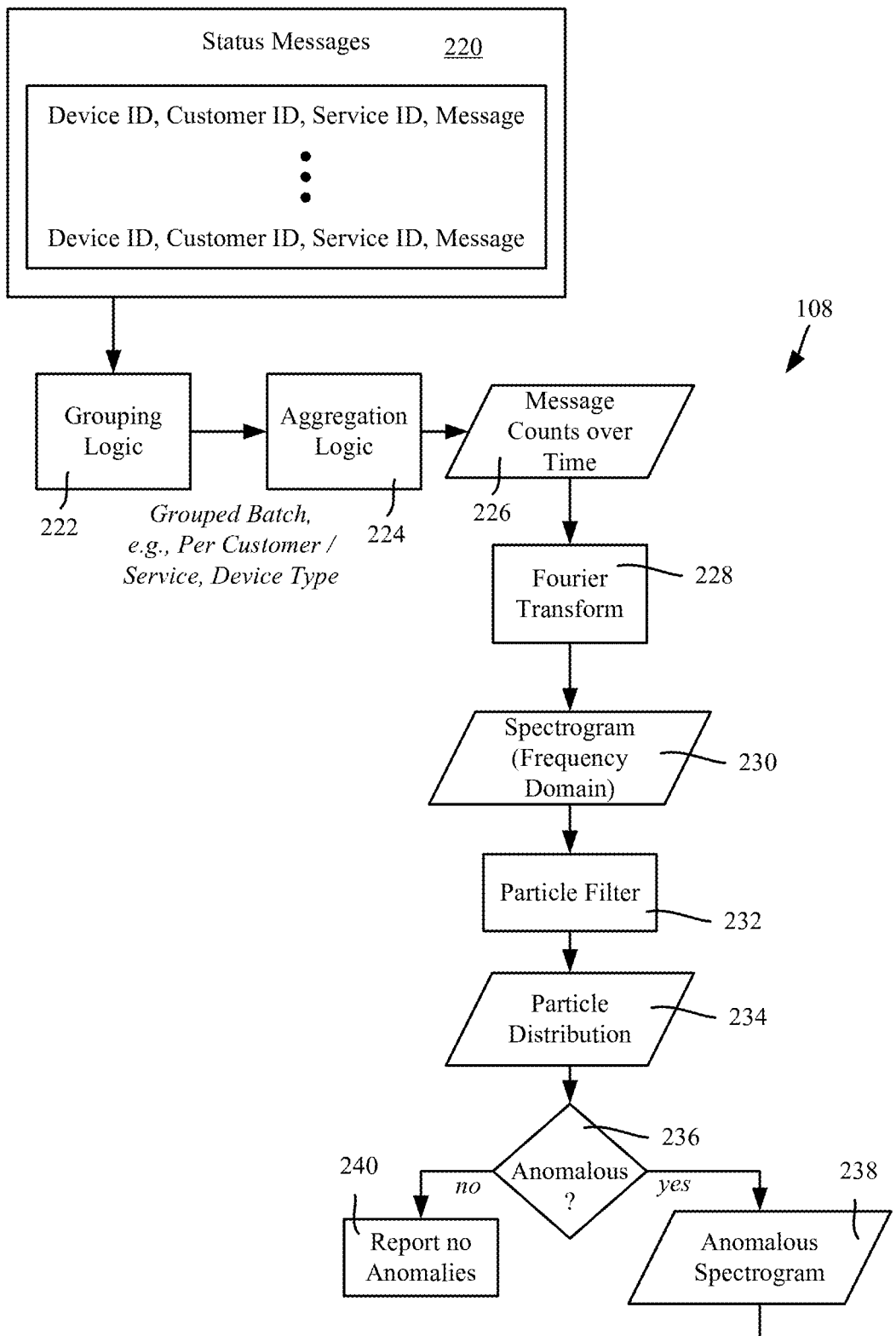
FIG. 2 is a block diagram illustrating an example system/ logic that evaluates whether network devices are in a failure state, in accordance with various aspects and embodiments of the subject disclosure.
Figure 3:
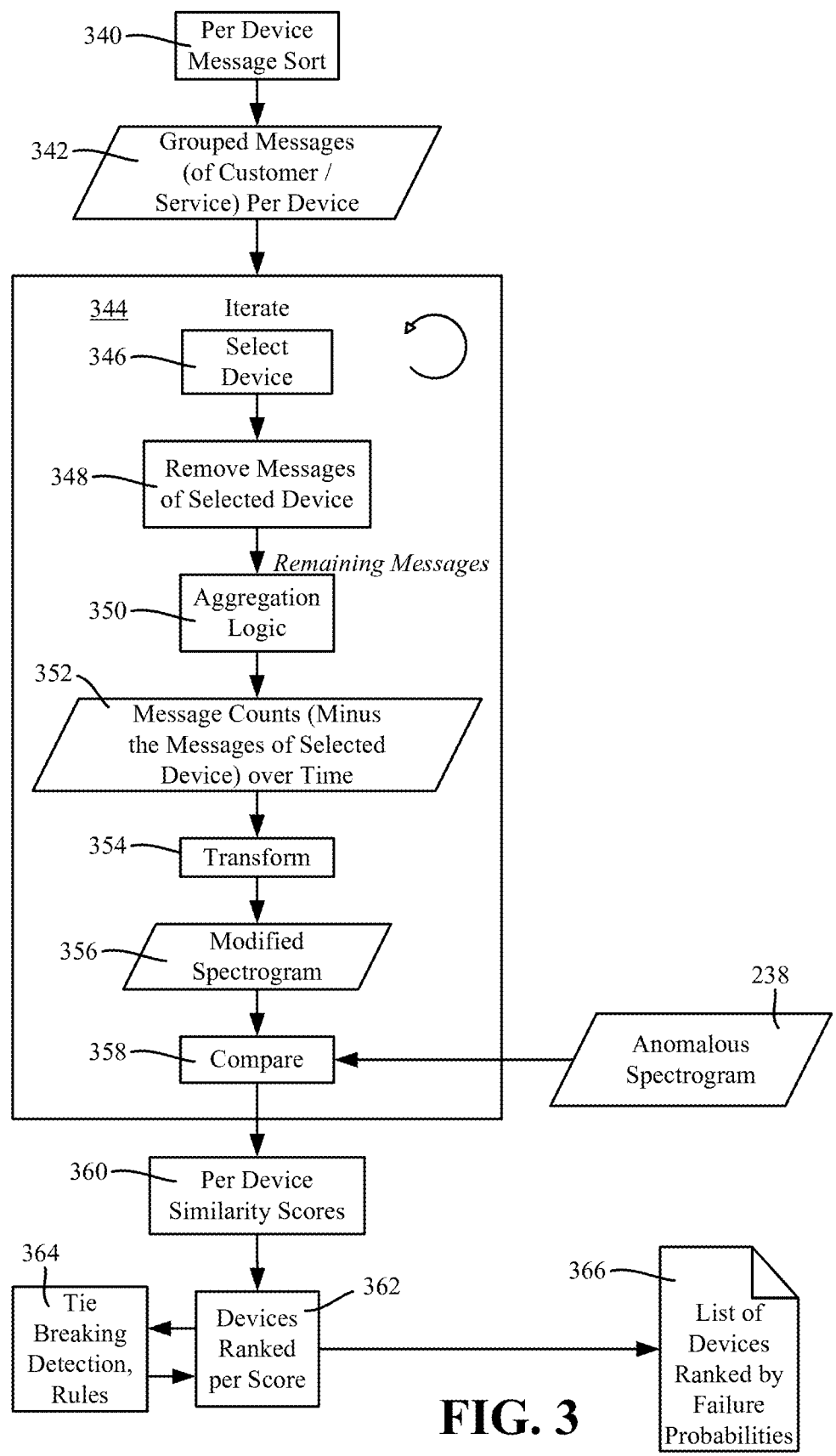
FIG. 3 is a block diagram illustrating an example system/ logic that determines which network device is most likely responsible for causing a network failure state, in accordance with various aspects and embodiments of the subject disclosure.
Figure 7:
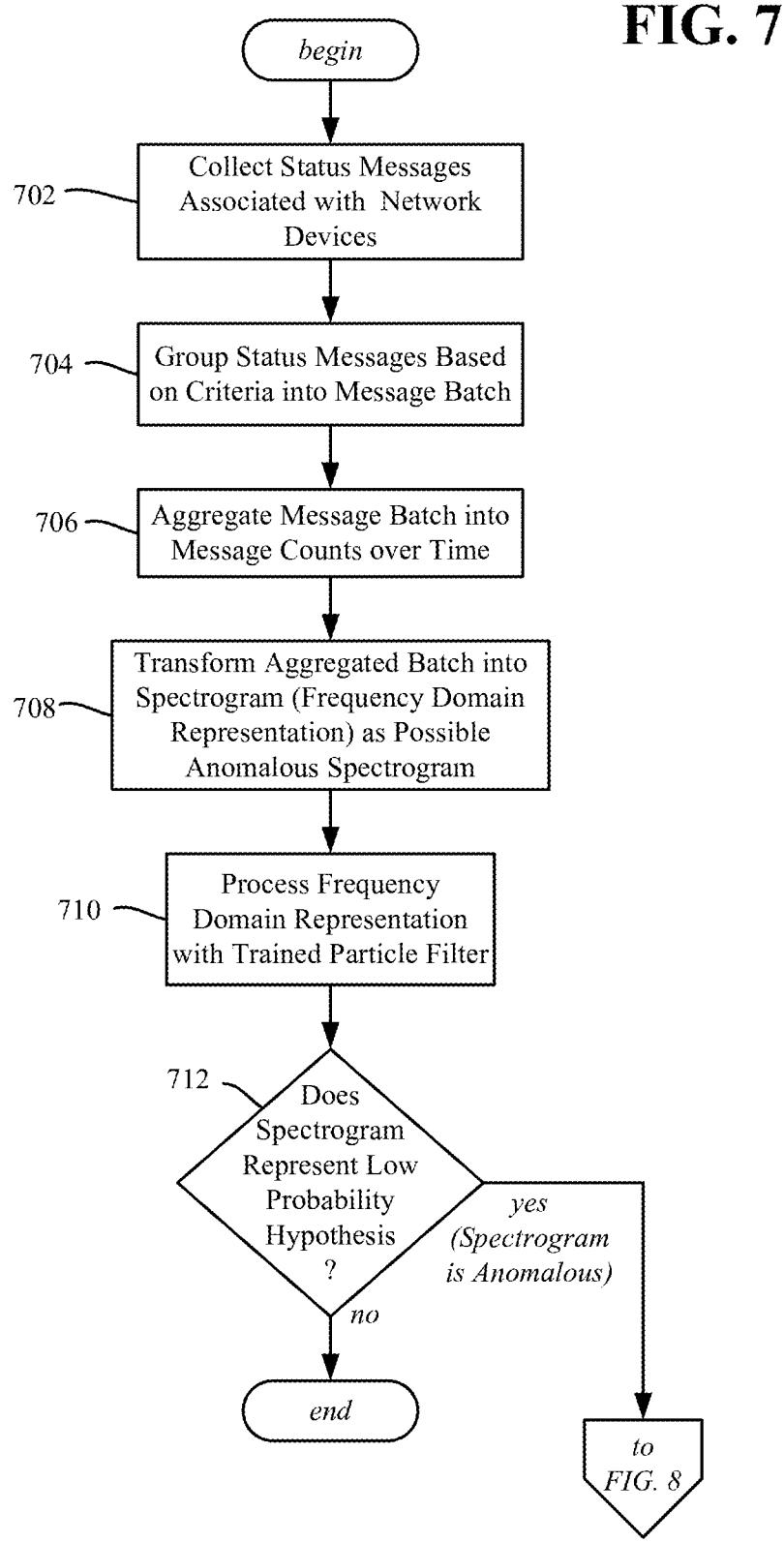
FIGS. 7-9 comprise a flow diagram representing example operations to detect an anomalous operating state and to determine the most probable cause of the anomalous operating state, in accordance with various aspects and embodiments of the subject disclosure.
Figure 8:
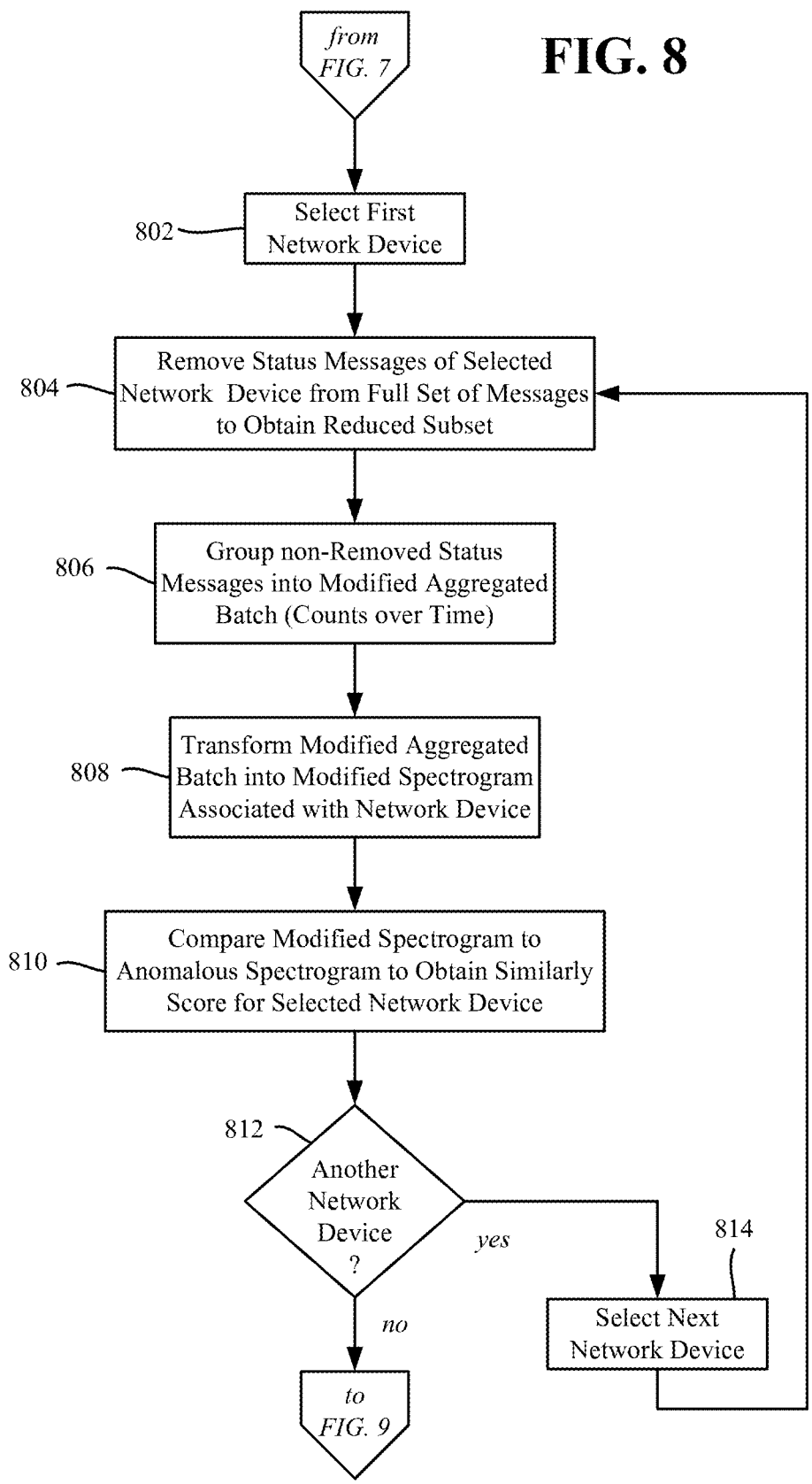

More specific example components and data are shown in FIGS. 2 and 3, and in the example operations of FIGS. 7-12, in which the technology described herein collects status messages 220 from devices and customers in the network, e.g., as generally shown in FIG. 1 and as represented by operation 702 of FIG. 7. As shown in the example of FIG. 2, the status messages 220 can be associated with their source devices (e.g., device ID), the customer they serve (e.g., customer ID), the type of service they provide (e.g., service ID), and/or the message content, such as error code data, alarm type data and so on. If not directly provided, a status message can be indirectly related to customer and/or service information based on the device ID. A timestamp may or may not accompany a message, however messages can be collected in various separate time windows and thus a group of messages can be related based on time. A status message corresponding to a customer indication need not be associated with an individual device, but can be associated with a subgroup of devices based on knowing who the customer is and a general problem (e.g., "network very slow today"). This is still useful information, at least with respect to detecting a network failure state that should be further investigated to determine which device is likely the culprit.

With this or similar information, equipment/status messages can be grouped by the customers they serve, the service or services they provide and so forth. This grouping can be before collecting status messages, e.g., sort from device group A to one data store, and device group B to another, or in a post-filtering/sorting operation. This is shown in the example of FIG. 2 by grouping logic 222, which can group messages as they are being received, or after messages are received, or a combination of both during (e.g., dividing messages as they are received into time windows) and after (e.g., filtering and/or sorting from a larger group). An example grouping operation is also shown by operation 704 of FIG. 7.

Figure 4A:
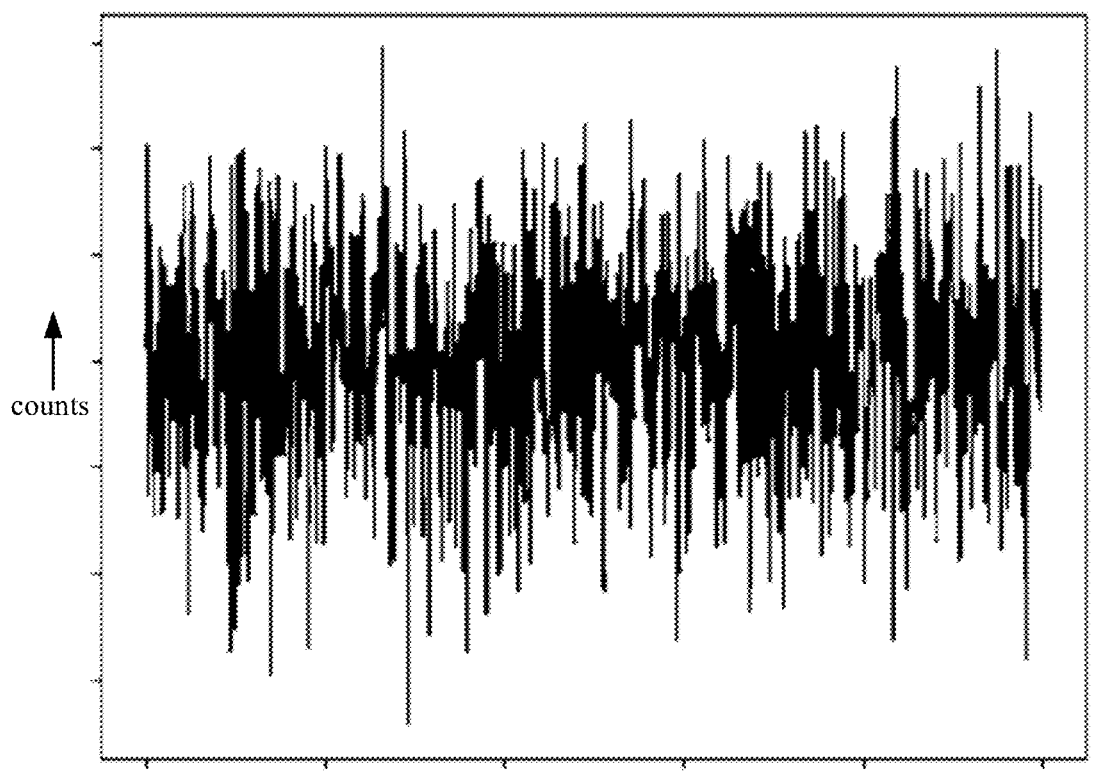
FIGS. 4A and 4B are example representations of message counts over time, including in a normal operating state (FIG. 4A) and in a failure state (FIG. 4B), in accordance with various aspects and embodiments of the subject disclosure.
Figure 4B:
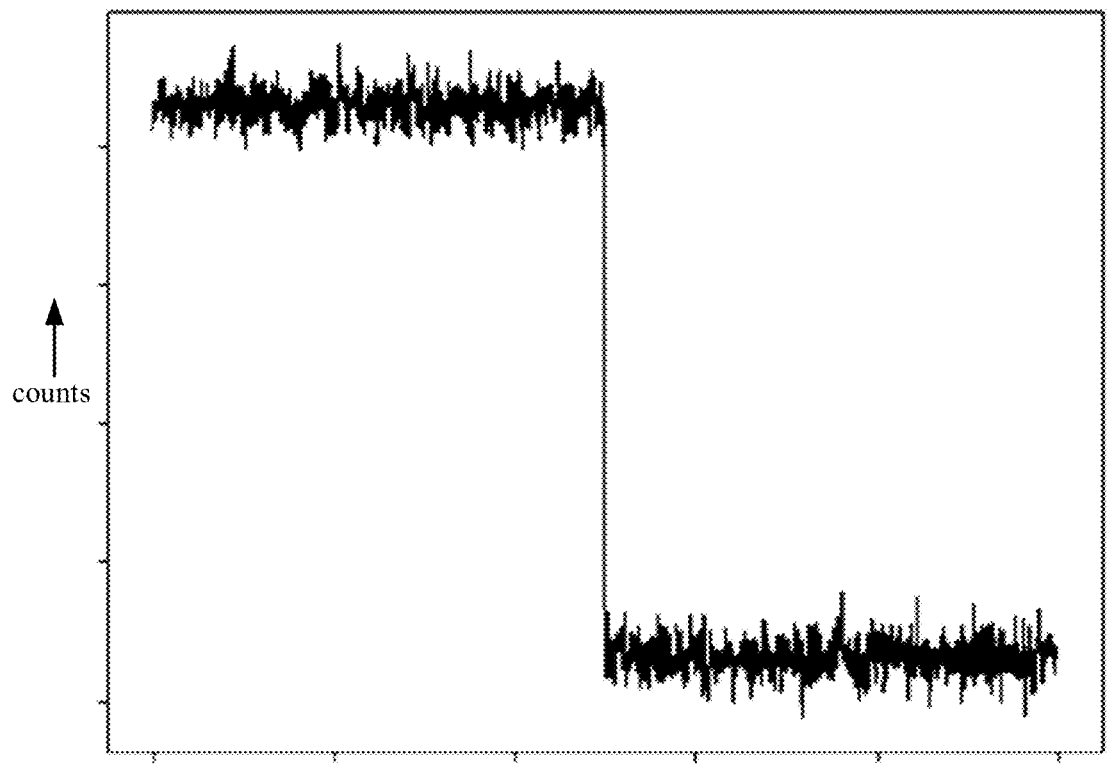
Figure 5A:
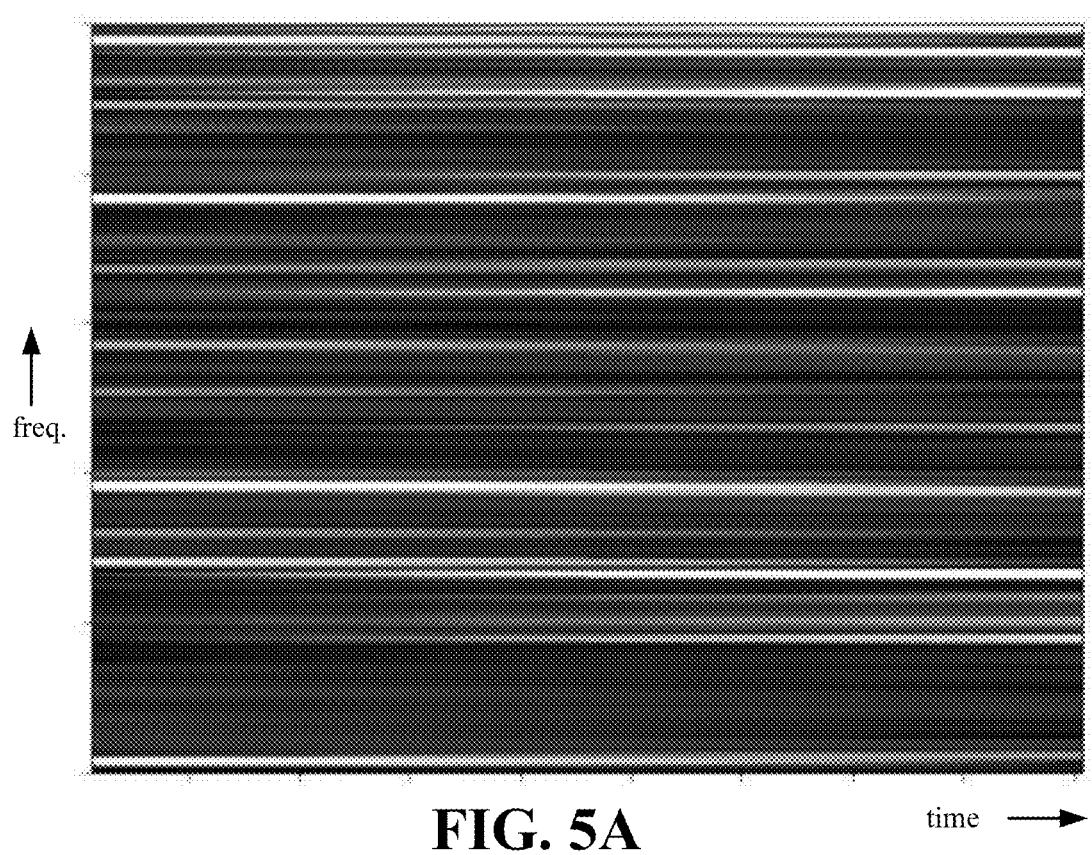
FIGS. 5A and 5B are example representations of spectrograms (frequency domain representations) corresponding to the message counts/time windows of FIGS. 4A and 4B, respectively, in accordance with various aspects and embodiments of the subject disclosure.
Figure 5B:
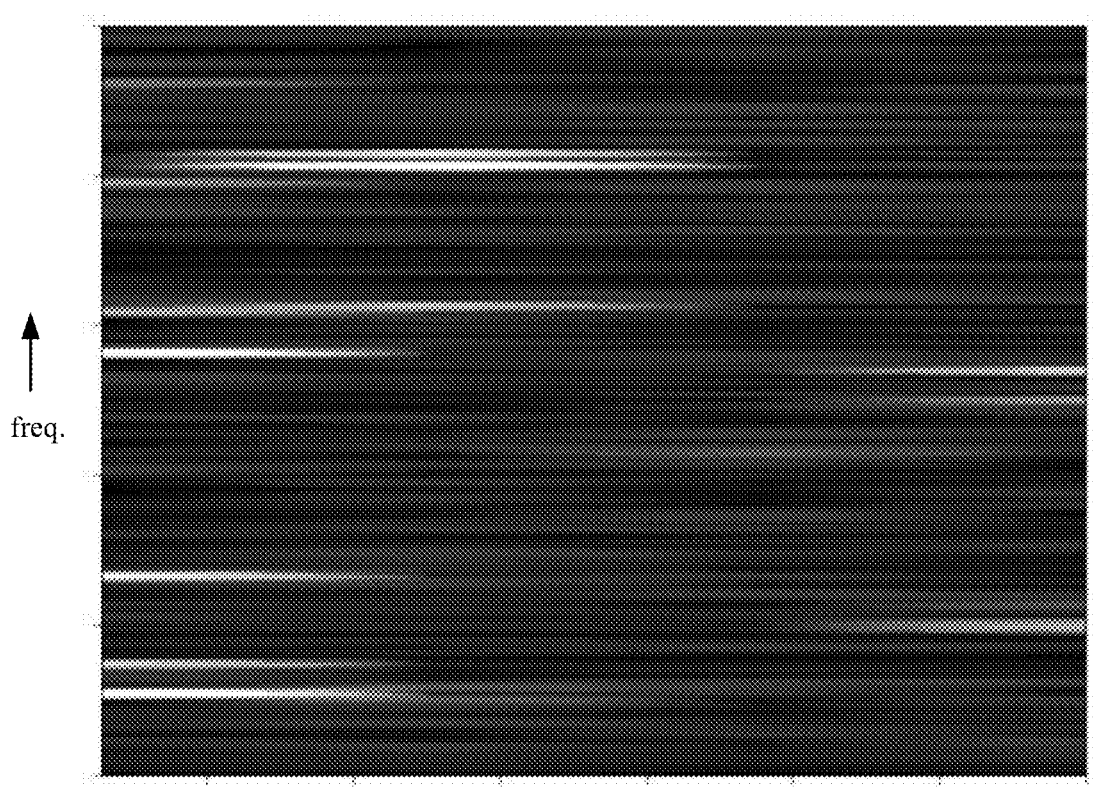

In any event, for each equipment and customer group, the technology thus obtains batches (groups of messages as they occur in time windows) of messages from the equipment and customers for aggregation. As shown in FIG. 2 and via operation 706 of FIG. 7, aggregation logic 224 processes the messages into message counts per time window (block 226). Graphical examples of message counts versus time are shown in FIGS. 4A and 4B.

The aggregated message counts per time window 226 obtained from each grouped batch are transformed into the frequency versus time values, using the discrete Fourier transform 228 for example. As shown in FIG. 7 via operation 708, the result is a spectrogram that may be anomalous, relative to normal operating conditions, as described herein. Note that as used herein the term "spectrogram" is used to refer to a frequency domain representation of the message counts over time, it is understood that such a "spectrogram" need not be visible or viewed by any human observer.

In general, the technology described herein learns the relationships between batches of observations in frequency power space and learns the highest probability connections between pairs. By learning the regular patterns of messages, the message patterns make it easier to identify when faults occur, because the pattern changes relative to a normal operating state. More particularly, the technology generates a transformed representation of the data in frequency versus time, based on the likelihood that in the frequency domain, the activities and trends for failure are more clearly represented than in the raw data. This has been found to be particularly true when attempting to detect when a lack of status signals and/or customer data indicates that failures occur.

An aspect of the technology is to estimate the latent operating state of each of a group of equipment providing services to customers, based on the observations gained from that equipment (i.e., the status messages from the equipment and the customer notifications of out-of-service conditions). To this end, in one implementation the technology described herein uses a particle filter 232 (FIG. 2) operation 710 (FIG. 7) to associate transitions between message patterns, that is, relative to their pattern under normal operating conditions. Note that one problem with analyzing messages from equipment and customers is that there is a significant noise component to the data; devices often report statuses that are not necessarily failure conditions, and when failures occur, the lack of messages may indicate failure, and/or customers may or may not report service-affecting conditions. Particle filters provide known approaches to tracking data under noisy conditions, and by generating hypotheses and weighting those hypotheses by their closeness to subsequent observations, the particle filter learns to associate a range of likely observations with ground truth observations.

More particularly, the particle filter generates hypothetical spectrograms and assigns a weight to each hypothesis. When an actual observation arrives, the technology adjusts the weight of each hypothesis based on the hypothesis closeness to the observation using a distance metric (e.g. Euclidean or cosine similarity). Over several observation sequences, higher weighted hypotheses are retained while low probability hypotheses are dropped. This is done to maintain computational tractability, and the number of particles can be tuned based on computational resource availability. The technology maintains a distribution of hypotheses; this distribution addresses the noisy nature of the signals; by maintaining a rich set of the most likely message spectrograms, the technology learns the normal operating characteristics of the equipment.

In other words, the particle filter 232 is first trained with normal operational data comprising batches of messages where normal operating conditions are observed. The particle filter 232 weights hypotheses using the observation sequences. When the next observation arrives, the method adjusts the weights for each hypothesis based on its closeness to the observation. In this way, the technology learns the most likely range of representations and the most likely transitions between them. In the context of fault detection, the particle filter 232 learns the normal operating states and transitions. When an equipment failure occurs, the frequency/time representation of messages changes, and the particle filter is affected. Note that batch data are overlapped so that a discontinuity between batches does not adversely affect the particle distribution.

Once a sufficient amount of training data are given to the particle filter 232, the technology is tested with known failure conditions. The technology ensures that the weights derived in the training sequences are sufficient for detecting error conditions.

Figure 6:
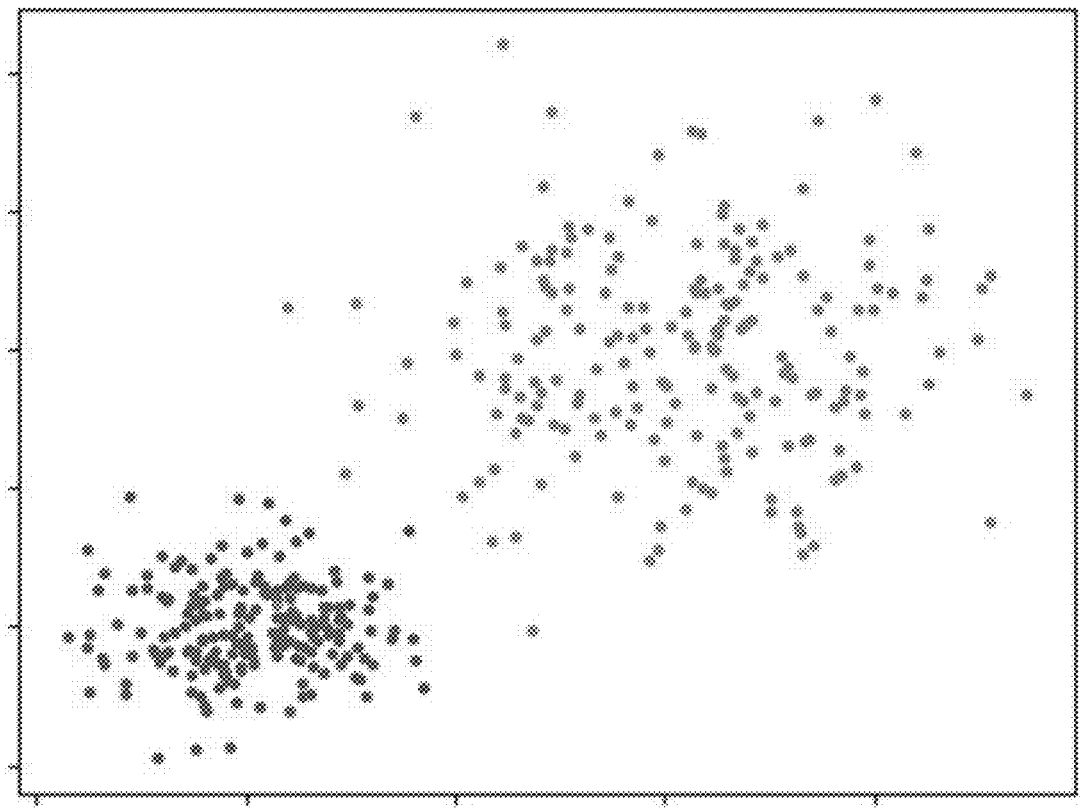
FIG. 6 is a plot of two cases of particle filter results, in accordance with various aspects and embodiments of the subject disclosure.

When sufficiently trained and tested, the particle filter 232 is connected to live data. When a failure occurs, the particle filter 232 encounters a spectrogram that from training, represents a low probability hypothesis, corresponding to an "anomalous" spectrogram. The effect on the particle filter 232 is that it needs to generate a set of hypotheses that explains the anomalous observation, in which the variance of the distribution of particles increases as a result. FIG. 6 shows an example plot of two cases of particle filter results from normal operating state tracking (dark gray, generally lower left corner) to failure state tracking (light gray, generally center to upper left corner). The low probability failure event induces detectable particle distribution change indicating a failure has occurred.

Although failure detection based on the particle distribution change provides valuable benefits by itself, the technology also facilitates localization of the problem to a specific device, or group of candidate devices. This is shown with reference to FIGS. 3, 8 and 9.

More particularly, when anomalies (failure states) are detected to a sufficient level user-configurable level of particle distribution change, the technology ranks equipment by their likelihood of being involved in the fault. This is shown by blocks 236 and 238 in FIG. 2 continuing on to FIG. 3, and operation 712 of FIG. 7 continuing on to the operations of FIG. 8. Otherwise the process ends for this group of devices, although some report or the like may be output when no anomaly is detected, e.g., as represented by block 240 of FIG. 2.

As shown in FIG. 3, blocks 340 and 342, the messages are sorted by their respective devices. As will be understood, this allows iteratively removing the messages of each device to see how that device's messages affected the results. For example, consider devices labeled A-Z; the messages from device A are removed, resulting in a reduced subset of the messages of devices B-Z being processed; next the messages from device B are removed, resulting in a different reduced subset of the messages of devices A and C-Z being processed, and so on.

In one implementation, as shown via blocks 344-356, the reduced subsets of messages are each processed as before, e.g., by aggregating them into message counts (blocks 350 and 352), transforming the message counts into frequency domain representations (modified spectrograms, blocks 354 and 356), and comparing (block 358) them with the anomalous spectrogram 238. This is also shown via operations 802-814 of FIG. 8. Comparison can be based on known image comparison techniques or the like, such as one that results in a score associated with each removed device's messages. Note that it is alternatively feasible to compare the modified spectrograms with any normal operating condition spectrogram for those devices (instead of the anomalous one), however the anomalous spectrogram represents a current operating state as opposed to an older "normal" operating state spectrogram.

In any event, the similarity scores or the like as represented in block 360 can be used to rank the devices based thereon, such that the device most likely responsible for the anomaly is known, then the next most likely and so on. This is represented via block 362 of FIG. 3 and operation 902 of FIG. 9.

Figure 9:
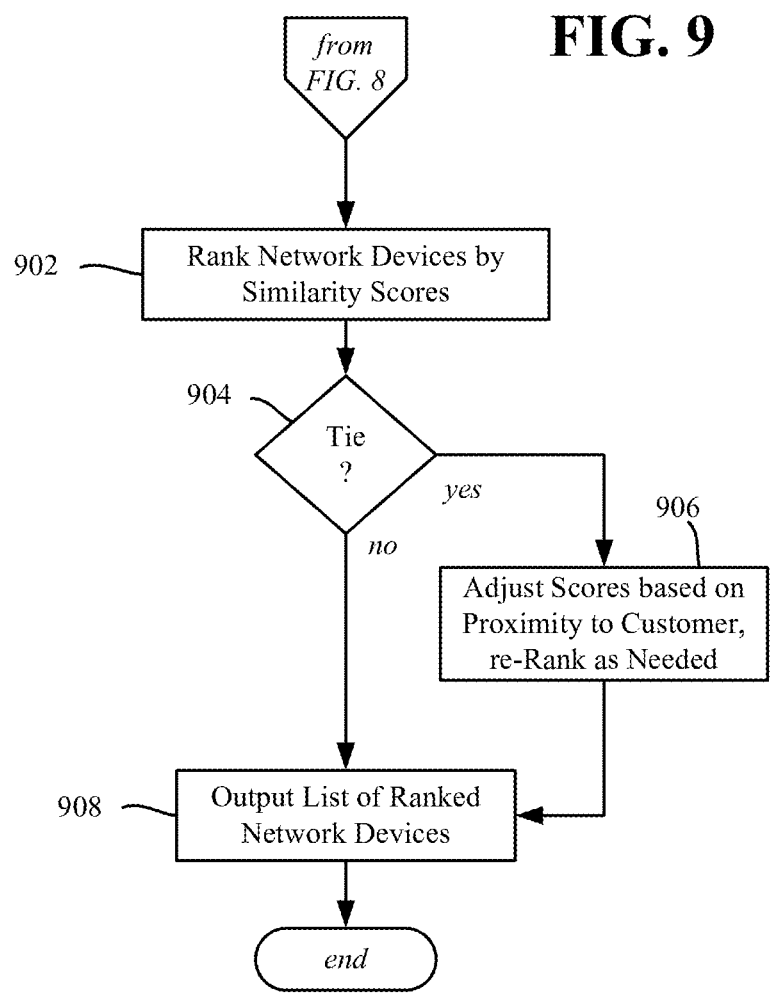

In the event of a statistical tie, e.g., the two top scores are within a defined closeness range, tie-breaking detection based on rules (block 364) can be used, as also shown via operations 904 and 906 of FIG. 9. With network devices in a topology, for example, a "tied" score can be modified based on proximity to the customer to come up with a most likely responsible device, e.g., more proximate the customer can add to the statistical score. Other information can be considered, e.g., historical data and the like. In any event, some information is generated and output ( )operation 908) is generated based on the results, such as a list of (at least the top j devices, or any device above twenty percent likely) candidate problematic devices (block 366 of FIG. 3), possibly along with some number indicative of the likelihood of being the cause of the anomaly (e.g., device 12345 has a seventy percent chance of being the cause of the failure state, followed by device 15947 with a twenty percent chance, and so on). This allows a technician or the like to much more efficiently hone in on the problem.

In sum, to localize the problematic device, the technology examines the associated message batch, and for each equipment in the batch, the technology removes its messages from aggregation, performs the frequency space transformation and compares the output spectrogram distance to the anomalous batch spectrogram. The relative distances of the "subtracted" spectrogram and the anomalous spectrogram indicate the likelihood each device plays in the anomaly. In the case of ties, additional rank weighting is assigned, e.g., to equipment proximate to the customer (lowest common ancestor). The technology returns the ranked list of equipment, e.g., highest ranked equipment (further distance from anomalous) being the most likely involved in the anomaly.

Figure 10:
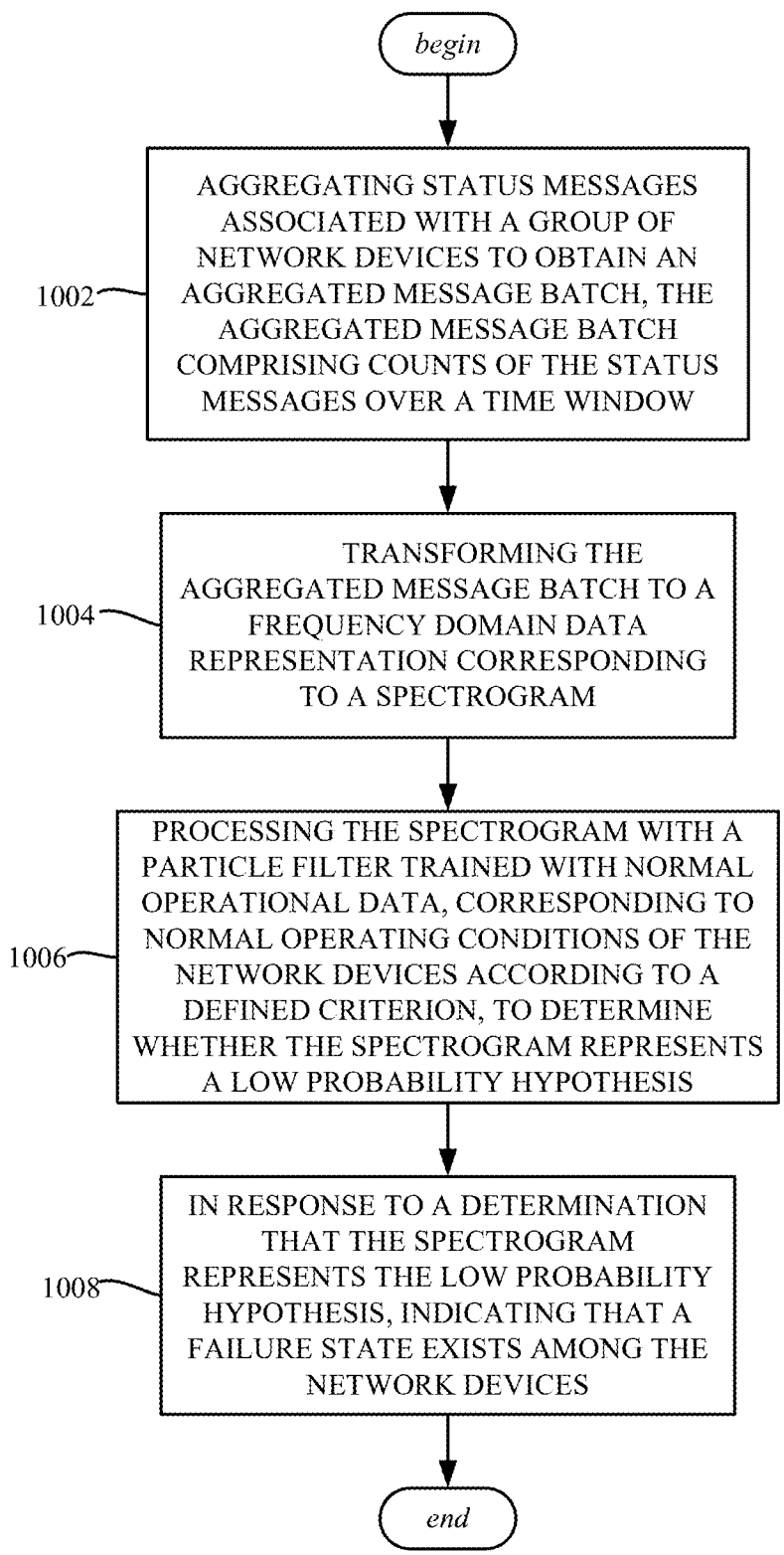
FIG. 10 is a flow diagram representing example operations to detect an anomalous operating state based on network status messages, in accordance with various aspects and embodiments of the subject disclosure.

One or more example concepts are represented in FIG. 10, and can correspond to network equipment comprising a processor, and a memory that stores executable instructions or components that, when executed by the processor, facilitate performance of operations. Example operation 1002 represents aggregating status messages associated with a group of network devices to obtain an aggregated message batch, the aggregated message batch comprising counts of the status messages over a time window. Operation 1004 represents transforming the aggregated message batch to a frequency domain data representation corresponding to a spectrogram. Operation 1006 represents processing the spectrogram with a particle filter trained with normal operational data, corresponding to normal operating conditions of the network devices according to a defined criterion, to determine whether the spectrogram represents a low probability hypothesis. Operation 1008 represents, in response to a determination that the spectrogram represents the low probability hypothesis, indicating that a failure state exists among the network devices.

The failure state can exist among the network devices, the frequency domain data representation corresponding to the spectrogram can include a first frequency domain data representation corresponding to a first spectrogram, and further operations can include obtaining a failure probability score for a selected network device of the group, which can include removing, from the status messages, the status messages associated with the selected network device to obtain a reduced aggregated message batch, transforming the reduced aggregated message batch to the frequency domain to obtain a second spectrogram, and comparing the second spectrogram with the first spectrogram to determine a similarity score corresponding to the failure probability score for the selected network device.

Comparing the second spectrogram with the first spectrogram to determine the similarity score can include determining a relative distance value between the first spectrogram and the second spectrogram. Further operations can include iteratively repeating the obtaining of a failure probability score for respective selected network devices, and ranking the network devices based on respective failure probability scores for the respective selected network devices. A tie in ranking can be determined based on the failure probability scores of two most likely failed network devices, and further operations can include selecting a most likely failed device from the two most likely failed network devices based on proximity of each most likely failed device to a customer.

The status messages can include at least one of: network protocol messages, error codes or alarms output by the network devices.

The status messages can include customer indications received from customer devices.

The status messages associated with the group of network devices can be grouped from a larger message dataset, which can include more status messages than the status messages, based on at least one of: a customer group served by the network devices, or network device service type information.

Further operations can include training the particle filter with the normal operational data, and testing the particle filter with input data corresponding to known failure conditions.

Figure 11:
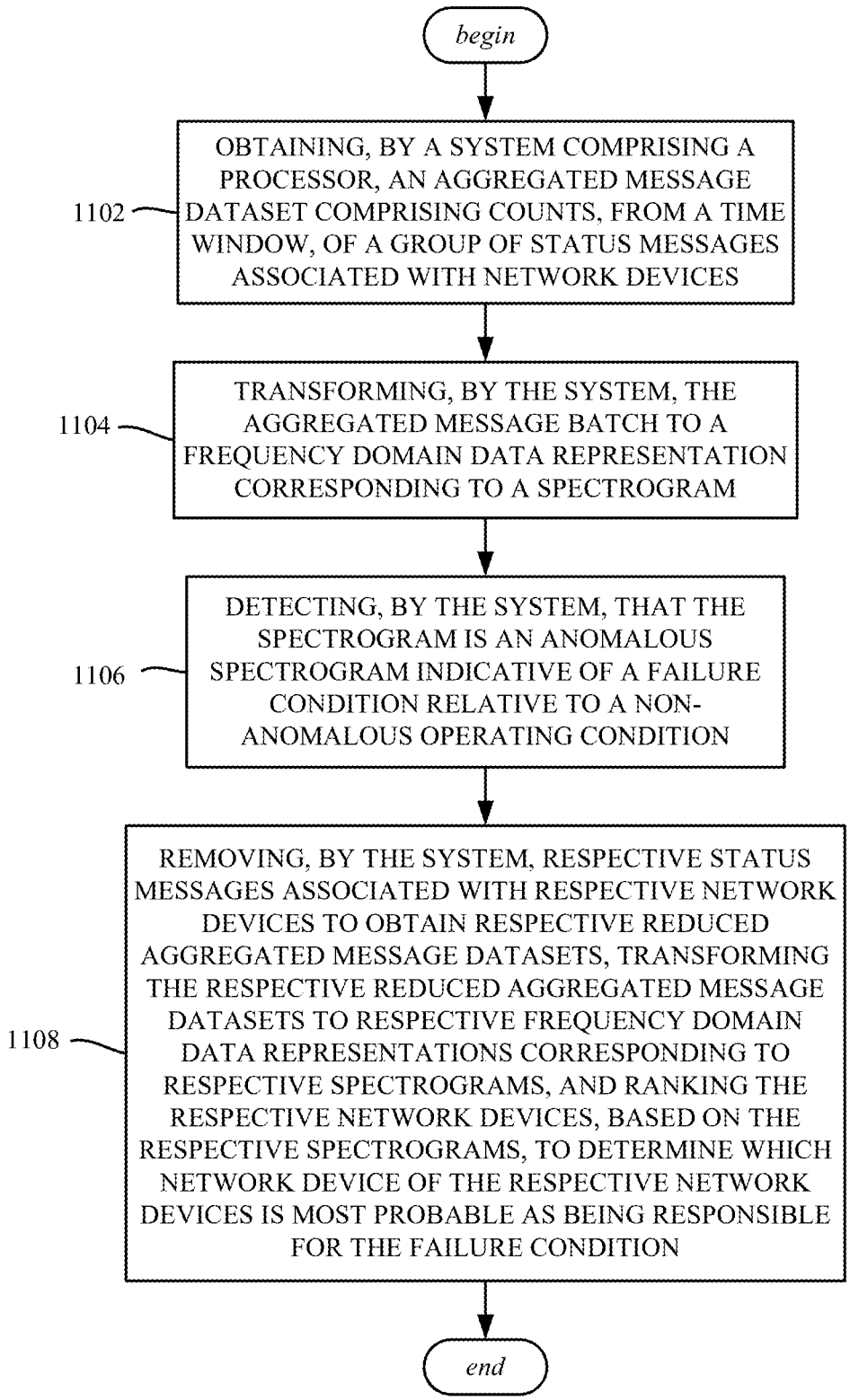
FIG. 11 is a flow diagram representing example operations to determine the cause of an anomalous operating state, in accordance with various aspects and embodiments of the subject disclosure.

One or more example concepts are represented in FIG. 11, and for example, can correspond to operations, e.g., of a method by a system including a processor. Operation 1102 represents obtaining, by a system comprising a processor, an aggregated message dataset comprising counts, from a time window, of a group of status messages associated with network devices. Operation 1104 represents transforming, by the system, the aggregated message batch to a frequency domain data representation corresponding to a spectrogram. Operation 1106 represents detecting, by the system, that the spectrogram is an anomalous spectrogram indicative of a failure condition relative to a non-anomalous operating condition. Operation 1108 represents removing, by the system, respective status messages associated with respective network devices to obtain respective reduced aggregated message datasets, transforming the respective reduced aggregated message datasets to respective frequency domain data representations corresponding to respective spectrograms, and ranking the respective network devices, based on the respective spectrograms, to determine which network device of the respective network devices is most probable as being responsible for the failure condition.

Ranking the respective network devices, based on the respective spectrograms, to determine which network device of the respective network devices is most probable as being responsible for the failure condition can include comparing the respective spectrograms with the anomalous spectrogram to determine respective similarity scores.

Two network devices can be determined to be candidates for being most probable as being responsible for the failure condition; aspects can include modifying the similarity scores of at least one candidate based on device proximity to a location associated with a customer.

Detecting that the spectrogram is an anomalous spectrogram can include processing the spectrogram with a particle filter trained with data corresponding to known non-anomalous operating conditions to determine that the spectrogram represents a low probability hypothesis.

Further operations can include outputting, by the system, a list indicating ranks of the respective network devices according to the ranking.

Obtaining the aggregated message dataset can include selecting the group of status messages from a larger message dataset based on at least one selection criterion.

Figure 12:
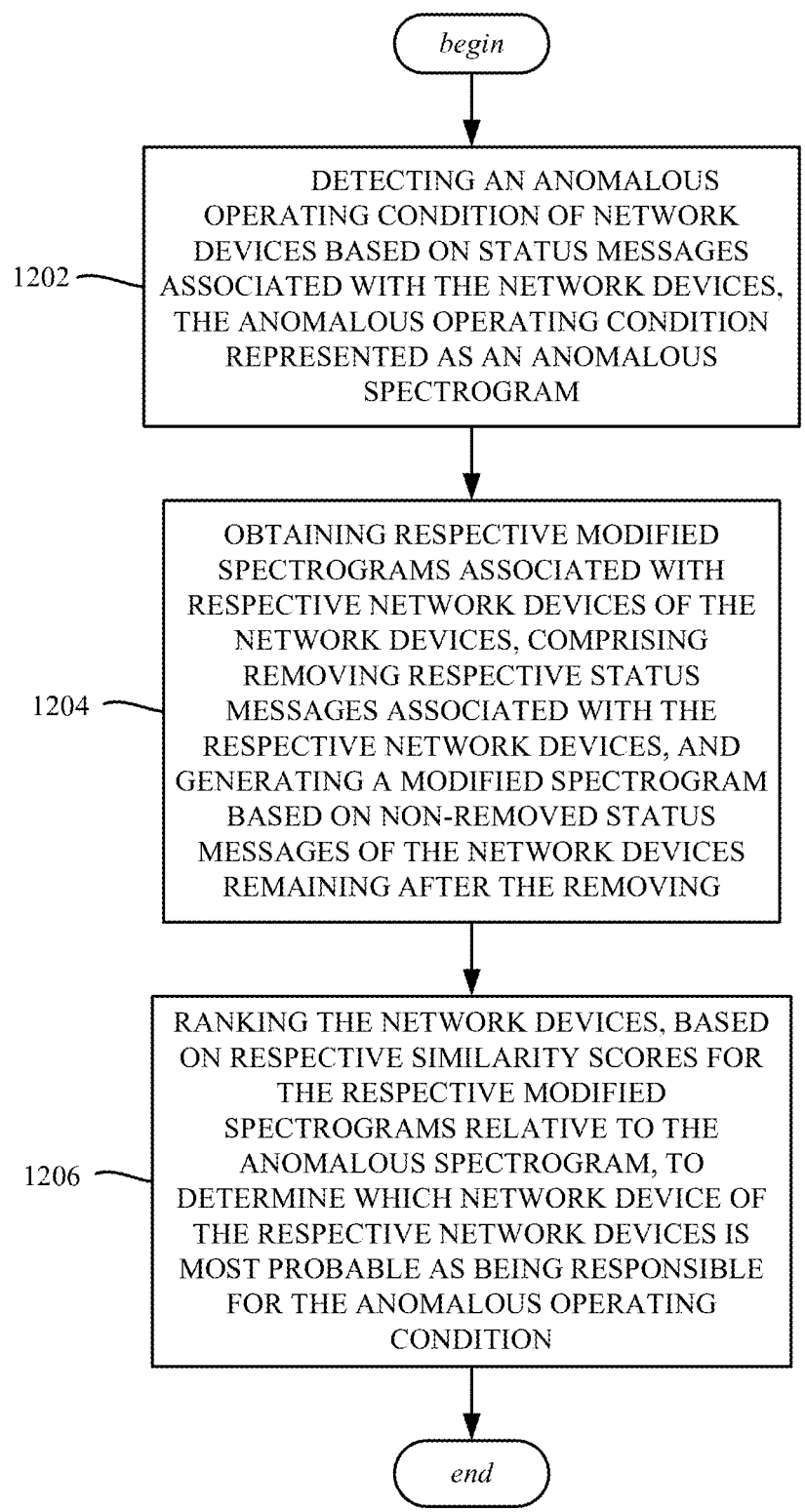
FIG. 12 is a flow diagram representing example operations to rank network devices by their likelihoods of being responsible for an anomalous operating condition, in accordance with various aspects and embodiments of the subject disclosure.

One or more aspects are represented in FIG. 12, such as implemented in a machine-readable medium, comprising executable instructions that, when executed by a processor, facilitate performance of operations. Example operation 1202 represents detecting an anomalous operating condition of network devices based on status messages associated with the network devices, the anomalous operating condition represented as an anomalous spectrogram. Operation 1204 represents obtaining respective modified spectrograms associated with respective network devices of the network devices, comprising removing respective status messages associated with the respective network devices, and generating a modified spectrogram based on non-removed status messages of the network devices remaining after the removing. Operation 1206 represents ranking the network devices, based on respective similarity scores for the respective modified spectrograms relative to the anomalous spectrogram, to determine which network device of the respective network devices is most probable as being responsible for the anomalous operating condition.

Detecting the anomalous operating condition can include transforming message counts of the status messages collected during a time window into an operating condition spectrogram, and processing the operating condition spectrogram via a particle filter trained with data corresponding to known normal operating conditions to determine that the operating condition spectrogram represents a low probability hypothesis, resulting in the anomalous spectrogram.

Further operations can include selecting the group of network devices based on a selection criterion.

Further operations can include using proximity of a network device to a customer as a tiebreaker of two respective similarity scores within a difference range of two respective network devices.

Generating the modified spectrogram can include applying a Fourier transform to counts of the status message, collected during a time window, of the non-removed status messages remaining after the removing.

As can be seen, the technology described herein collects status messages such as simple network protocol messages, error codes, and other status messages from equipment and customers into batches as they occur. The batches can be overlapped in time. The technology groups and aggregates messages, then transforms the aggregations to the frequency domain A particle filter is employed to learn the patterns of activity in frequency versus time space, and anomalies induce detectable changes in the particle distribution. When the particle filter finds a low probability state (error condition), the particle distribution sufficiently changes, indicating an anomalous event.

If an anomaly is detected, batches associated with detected anomalies contain equipment sets. By comparing spectrograms from reduced equipment subsets to determine frequency/time differences, the technology determines which equipment activity correlates with the anomaly. In this way, the technology described herein operates to localize failures, which helps to increase network throughput over time and reduce technician workloads for network service providers. The technology transforms the signals (status messages from equipment and customer indications of network failure) into the frequency domain. The technology batches observations to transform message aggregations into the frequency domain: producing power values at frequencies indicating the baseline rate when messages arrive for a piece of equipment.

The benefits of the technology described herein include identifying and localizing failure conditions in a networked group of devices, as well as general event anomaly detection based on particle filter, as any group of signals that display regular or normal operating states can be tracked, and anomalies from the normal state can be detected to arbitrary levels of precision. Localization to specific equipment is facilitated by comparing differences between normal and anomalous data in frequency/time space. The technology is scalable, e.g., via low computational effort based on equipment group sizes. Efficient discrete Fourier transform algorithms exist ($O(n \log n)$), and ranking equipment only requires $O(n \log n)$ sorting. Explanation is a natural out-come, as which equipment messages are missing or that are present in the face of an anomaly are derived.

Figure 13:
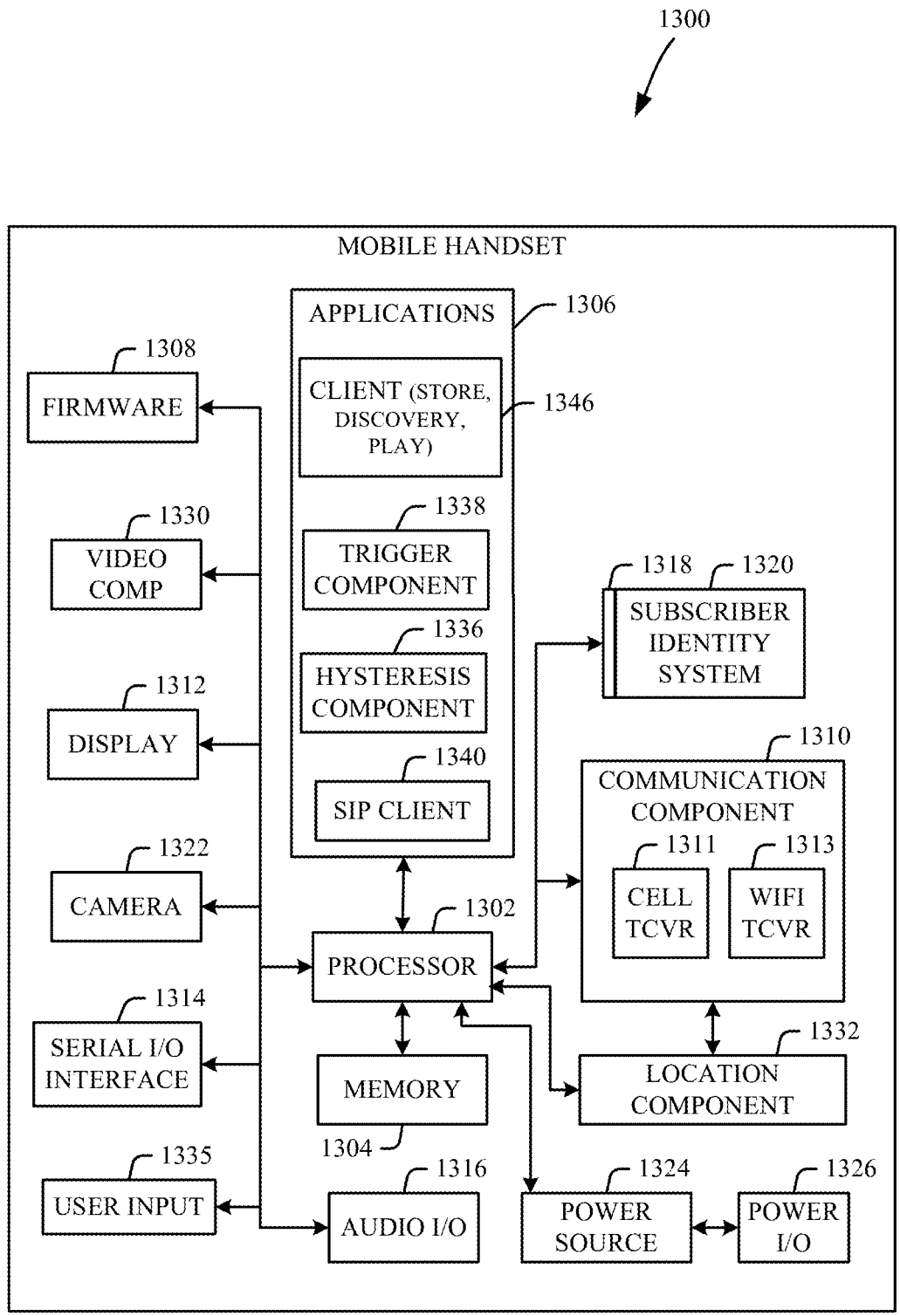
FIG. 13 illustrates an example block diagram of an example mobile handset operable to engage in a system architecture that facilitates wireless communications according to one or more embodiments described herein.

Referring now to FIG. 13, illustrated is a schematic block diagram of an example end-user device (such as user equipment) that can be a mobile device 1300 capable of connecting to a network in accordance with some embodiments described herein. Although a mobile handset 1300 is illustrated herein, it will be understood that other devices can be a mobile device, and that the mobile handset 1300 is merely illustrated to provide context for the embodiments of the various embodiments described herein. The following discussion is intended to provide a brief, general description of an example of a suitable environment 1300 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1300 includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communication component 1310 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1322 (e.g., a camera) can be provided for decoding encoded multimedia content. The video processing component 1322 can aid in facilitating the generation, editing and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1338 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 810, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 14:
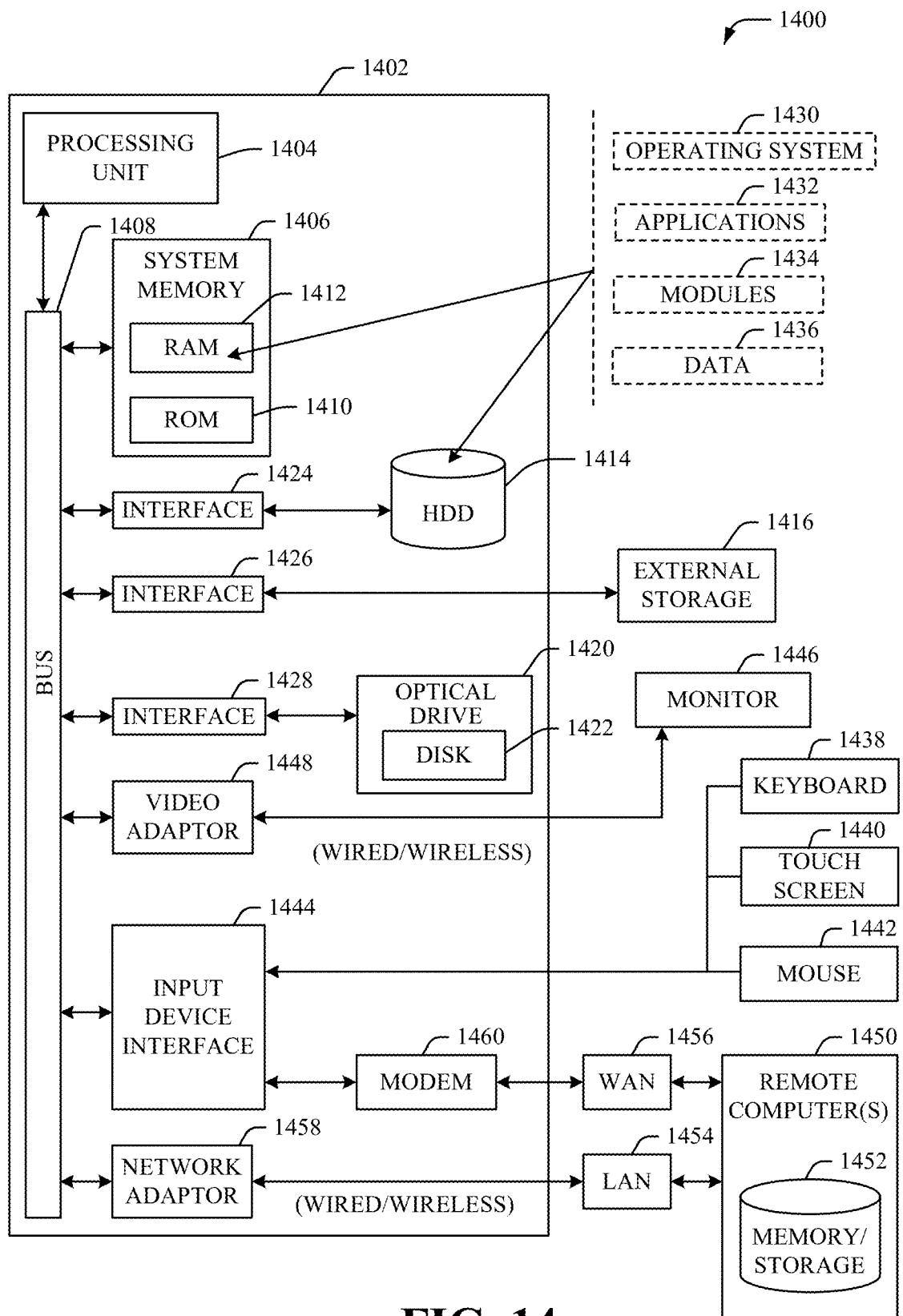
FIG. 14 illustrates an example block diagram of an example computer/machine system operable to engage in a system architecture that facilitates wireless communications according to one or more embodiments described herein.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD), non-volatile memory and other storage technology could be used in addition to, or in place of, an HDD 1414, and can be internal or external. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally include emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can include one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1294 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 14 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions which, when executed by the processor of the system, facilitate performance of operations, the operations comprising:
   aggregating status messages associated with a group of network devices to obtain an aggregated message batch, the aggregated message batch comprising counts of the status messages over a time window;
   transforming the aggregated message batch to a first frequency domain data representation corresponding to a first spectrogram;
   processing the spectrogram with a particle filter trained with normal operational data, corresponding to normal operating conditions of the network devices according to a defined criterion, to determine whether the spectrogram represents a low probability hypothesis;
   in response to a determination that the spectrogram represents the low probability hypothesis, indicating that a failure state exists among the network devices, wherein the failure state exists among the network devices; and
   obtaining a failure probability score for a selected network device of the group, comprising:
   removing, from the status messages, the status messages associated with the selected network device to obtain a reduced aggregated message batch,
   transforming the reduced aggregated message batch to the frequency domain to obtain a second spectrogram, and
   comparing the second spectrogram with the first spectrogram to determine a similarity score corresponding to the failure probability score for the selected network device.

2. The system of claim 1, wherein the comparing of the second spectrogram with the first spectrogram to determine the similarity score comprises determining a relative distance value between the first spectrogram and the second spectrogram.

3. The system of claim 1, wherein the operations further comprise iteratively repeating the obtaining of the failure probability score for respective selected network devices, and ranking the network devices based on respective failure probability scores for the respective selected network devices.

4. The system of claim 3, wherein a tie in ranking is determined based on the failure probability scores of two most likely failed network devices, and wherein the operations further comprise selecting a most likely failed device from the two most likely failed network devices based on proximity of each most likely failed device to a customer.

5. The system of claim 1, wherein the status messages comprise network protocol message.

6. The system of claim 1, wherein the status messages comprise customer indications received from customer devices.

7. The system of claim 1, wherein the status messages associated with the group of network devices are grouped from a larger message dataset, comprising more status messages than the status messages, based on at least one of: a customer group served by the network devices, or network device service type information.

8. The system of claim 1, wherein the operations further comprise training the particle filter with the normal operational data, and testing the particle filter with input data corresponding to known failure conditions.

9. The system of claim 1, wherein the status messages comprise error codes.

10. The system of claim 1, wherein the status messages comprise alarms output by the network devices.

11. A method, comprising:
obtaining, by a system comprising a processor, an aggregated message dataset comprising counts, from a time window, of a group of status messages associated with network devices;
transforming, by the system, the aggregated message batch to a frequency domain data representation corresponding to a spectrogram;
detecting, by the system, that the spectrogram is an anomalous spectrogram indicative of a failure condition relative to a non-anomalous operating condition; and
removing, by the system, respective status messages associated with respective network devices to obtain respective reduced aggregated message datasets, transforming the respective reduced aggregated message datasets to respective frequency domain data representations corresponding to respective spectrograms, and ranking the respective network devices, based on the respective spectrograms, to determine which network device of the respective network devices is most probable as being responsible for the failure condition,
wherein the detecting that the spectrogram is an anomalous spectrogram comprises processing the spectrogram with a particle filter trained with data corresponding to known non-anomalous operating conditions to determine that the spectrogram represents a low probability hypothesis.

12. The method of claim 11, wherein the ranking of the respective network devices, based on the respective spectrograms, to determine which network device of the respective network devices is most probable as being responsible for the failure condition comprises comparing the respective spectrograms with the anomalous spectrogram to determine respective similarity scores.

13. The method of claim 12, wherein two network devices are determined to be candidates for being most probable as being responsible for the failure condition, and further comprising modifying the similarity scores of at least one candidate based on device proximity to a location associated with a customer.

14. The method of claim 11, further comprising outputting, by the system, a list indicating ranks of the respective network devices according to the ranking.

15. The method of claim 11, wherein the obtaining of the aggregated message dataset comprises selecting the group of status messages from a larger message dataset based on at least one selection criterion.

16. A non-transitory machine-readable medium, comprising executable instructions that, when executed by a processor, facilitate performance of operations, the operations comprising:
detecting an anomalous operating condition of network devices based on status messages associated with the network devices, the anomalous operating condition represented as an anomalous spectrogram;
obtaining respective modified spectrograms associated with respective network devices of the network devices, comprising removing respective status messages associated with the respective network devices, and generating a modified spectrogram based on non-removed status messages of the network devices remaining after the removing, wherein the generating the modified spectrogram comprises applying a Fourier transform to counts of the status message, collected during a time window, of the non-removed status messages remaining after the removing; and
ranking the network devices, based on respective similarity scores for the respective modified spectrograms relative to the anomalous spectrogram, to determine which network device of the respective network devices is most probable as being responsible for the anomalous operating condition.

17. The non-transitory machine-readable medium of claim 16, wherein the detecting the anomalous operating condition comprises transforming message counts of the status messages collected during a time window into an operating condition spectrogram.

18. The non-transitory machine-readable medium of claim 17, wherein the detecting the anomalous operating condition further comprises processing the operating condition spectrogram via a particle filter trained with data corresponding to known normal operating conditions to determine that the operating condition spectrogram represents a low probability hypothesis, resulting in the anomalous spectrogram.

19. The non-transitory machine-readable medium of claim 16, wherein the operations further comprise selecting the group of network devices based on a selection criterion.

20. The non-transitory machine-readable medium of claim 16, wherein the operations further comprise using proximity of a network device to a customer as a tiebreaker of two respective similarity scores within a difference range of two respective network devices.

* * * * *

UNITED STATES PATENT AND TRADEMARK OFFICE
CERTIFICATE OF CORRECTION

| | |
|---|---|
| PATENT NO. | : 11,558,241 B1 |
| APPLICATION NO. | : 17/471413 |
| DATED | : January 17, 2023 |
| INVENTOR(S) | : George Goehring, Barry Karesh and Rudolph Mappus |

It is certified that error appears in the above-identified patent and that said Letters Patent is hereby corrected as shown below:

On the Title Page

Item (73), Assignee. A second assignee -- AT&T Mobility II LLC, Atlanta, GA (US) -- should be added below AT&T Intellectual Property I, L.P., Atlanta, GA (US).

Signed and Sealed this
Twenty-first Day of March, 2023

Katherine Kelly Vidal
*Director of the United States Patent and Trademark Office*